V. LUCAS & C. BAUER.
GRAIN DRIER.
APPLICATION FILED MAY 10, 1911.
1,024,408.
Patented Apr. 23, 1912.
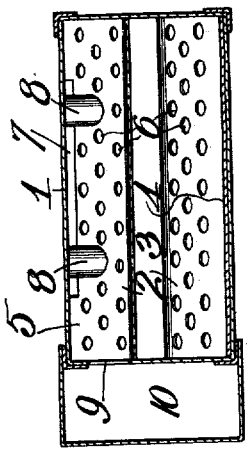
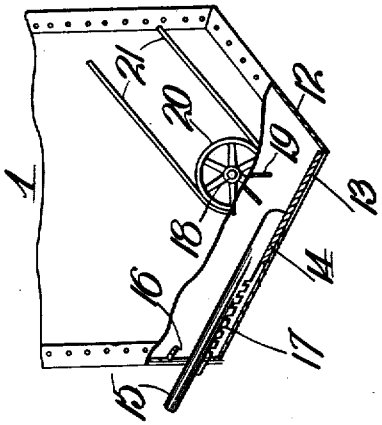
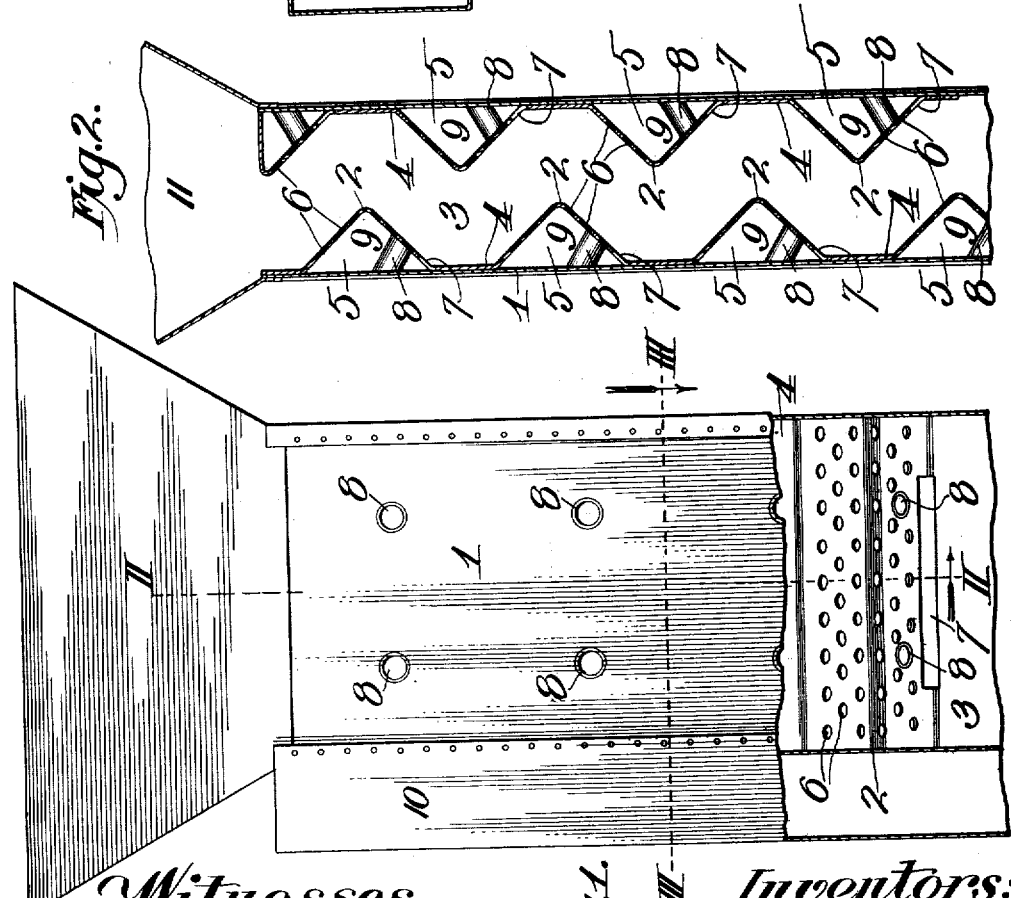
Witnesses
Frank R. Slow
H. C. Rodgers
Inventors:
V. Lucas and
C. Bauer
By George H. Thorpe Atty.

UNITED STATES PATENT OFFICE.

VALENTINE LUCAS AND CHRISTIAN BAUER, OF KANSAS CITY, MISSOURI; SAID BAUER ASSIGNOR TO HUGH J. PUCKETT, OF KANSAS CITY, MISSOURI.

GRAIN-DRIER.

1,024,408.   Specification of Letters Patent.   Patented Apr. 23, 1912.

Application filed May 10, 1911. Serial No. 626,637.

*To all whom it may concern:*

Be it known that we, VALENTINE LUCAS and CHRISTIAN BAUER, citizens of the United States, residing at Kansas City, in the county of Jackson and State of Missouri, have invented certain new and useful Improvements in Grain-Driers, of which the following is a specification.

This invention relates to grain driers of that class in which flowing grain is subjected to a blast of hot air, and our object is to produce a machine of the character mentioned whereby the air is widely disseminated and uniformly distributed throughout the mass of grain to thoroughly and quickly dry the same.

With this general object in view and others as hereinafter appear, the invention consists in certain novel and peculiar features of construction and organization as hereinafter described and claimed; and in order that it may be fully understood reference is to be had to the accompanying drawing, in which:—

Figure 1, is an elevation broken away, of a part of a grain drier embodying our invention. Fig. 2, is a vertical section on the line II—II of Fig. 1. Fig. 3, is a section on the line III—III of Fig. 1. Fig. 4, is an enlarged edge view of the lower extremity of the drier, partly broken away.

In the said drawing, 1 indicates a chute preferably vertical and rectangular in cross section, and secured to opposite walls of and within the chute are V-shaped deflectors 2, the deflectors at one side being arranged in staggered relation to those at the opposite side so that the two sets of deflectors together will divide the chute into a zig-zag or tortuous passage 3. In practice it is preferred that a plurality of each set of V-shaped deflectors shall be of integral formation and connected together by the intermediate vertical portions 4.

The V-shaped deflectors not only divide the interior of the chute to form a tortuous passage but they also form hot air passages or chambers 5, and to establish communication between the passages or chambers 5 and the tortuous passage 3, the said deflectors are provided with numerous perforations 6 too small for any but fine grain to pass through. The lower portions of the V-shaped deflectors are also provided with openings 7 so that fine grain which may enter chambers 5 shall escape therefrom through openings 7 and thus by not collecting in and gradually filling said chambers, avoid obstructing the proper dissemination and distribution of the air supplied to said chambers for the purpose of drying the grain flowing through the passage, and in order to provide for the proper circulation of such air and its quick escape from the mass of grain, a plurality of tubes 8 establish communication between the tortuous passage and the atmosphere, said tubes extending upwardly and outwardly through chambers 5 from the lower portions of the deflectors, as shown most clearly in Fig. 2.

To supply the chambers 5 with heated air, which may be under pressure, one of the end walls of the chute is provided with an opening 9 registering with the said chambers, the heated air entering chambers 5 from a pipe 10 supplied with heated air from any suitable source, not shown. The chute is preferably equipped at its upper end with a hopper 11 into which the grain to be dried is discharged from an elevator or bin, as common in grain elevator construction. The drier is adapted to be of considerable length so that the grain shall be thoroughly dried before it is discharged, and the lower end is preferably of hopper form as at 12, with one side of the bottom or end provided with an opening 13 of substantially the same area as a cross section of the tortuous passage, and controlling the escape of the grain through said opening is a cut-off 14 resting upon the apertured portion with a handle 15 extending through an opening 16 in the corresponding side wall, the said handle having a plurality of notches 17 for engagement with the said side wall at the lower edge of opening 16, to secure the cut-off at the desired point of adjustment.

18 is a shaft extending through the tortuous passage near the bottom of the chute and provided within the latter with a rotary agitator or stirrer 19, and said shaft and agitator or stirrer are rotated by means of a pulley 20 secured on one end of the shaft and engaged by a drive-belt 21 running from a counter-shaft or other motive power, not shown. In operation this agitator keeps the grain in motion and guards against any possibility of chokage in the tortuous passage. It will be noted that owing to the arrangement of the perforated deflectors, the heated air is discharged through the grain flowing through the tortuous passage in practically every direction and for the full length of the passage and that in consequence, every particle of the grain is subjected to the action of the blast and is therefore thoroughly dried, it being understood that the storage of damp grain would result in its deterioration or decay.

From the above description it will be apparent that we have produced a grain drier of simple, strong, durable and comparatively inexpensive construction, wherein the grain can be efficiently and thoroughly dried at small expense and without requiring constant supervision on the part of the person in charge, and that while we have illustrated and described its preferred embodiment, we wish it to be understood that minor changes may be resorted to without departing from the spirit and scope of the appended claims.

We claim:—

1. A grain drier, comprising a chute, means dividing the chute into a tortuous passage and series of chambers disposed at opposite sides of said passage and in staggered relation to each other; the dividing means being of foraminous material, means for discharging air into said chambers, and air-escape pipes extending upwardly and outwardly through said chambers and communicating at their inner ends with the tortuous passage and at their outer ends with the atmosphere.

2. A grain drier, comprising a chute, perforated deflectors secured within and at opposite sides of the chute and arranged in staggered relation to form a tortuous passage and two series of chambers in staggered relation to each other, one end wall of the chute having openings communicating with said chambers, means for discharging air through said openings into said chambers, and means extending upwardly and outwardly through said chambers for the escape of air from the tortuous passage to the atmosphere.

3. A grain drier comprising a chute, perforated V-shaped deflectors arranged horizontally within and secured to opposite walls of the chute to partition the same into a tortuous passage and two series of chambers, the lower portions of the deflectors being provided with openings, and one end wall of the chute with openings communicating with said chambers, means for supplying air to said chambers through the openings in the said end wall, and pipes extending upwardly and outwardly and establishing communication between the tortuous passage and the atmosphere.

4. A grain drier comprising a chute in the form of a tortuous passage, provided with a hopper bottom having an opening in the lower end of one side, an adjustable slide arranged within the chute and upon the side of the bottom provided with said opening, and means for agitating grain in the lower end of the tortuous passage at a point adjacent to the said opening of the bottom.

In testimony whereof we affix our signatures, in the presence of two witnesses.

VALENTINE LUCAS.
CHRISTIAN BAUER.

Witnesses:
HELEN C. RODGERS,
G. Y. THORPE.